May 21, 1968 M. J. BERARDI 3,384,239
PURIFICATION AND RECIRCULATION OF LIQUID
Filed Dec. 7, 1965
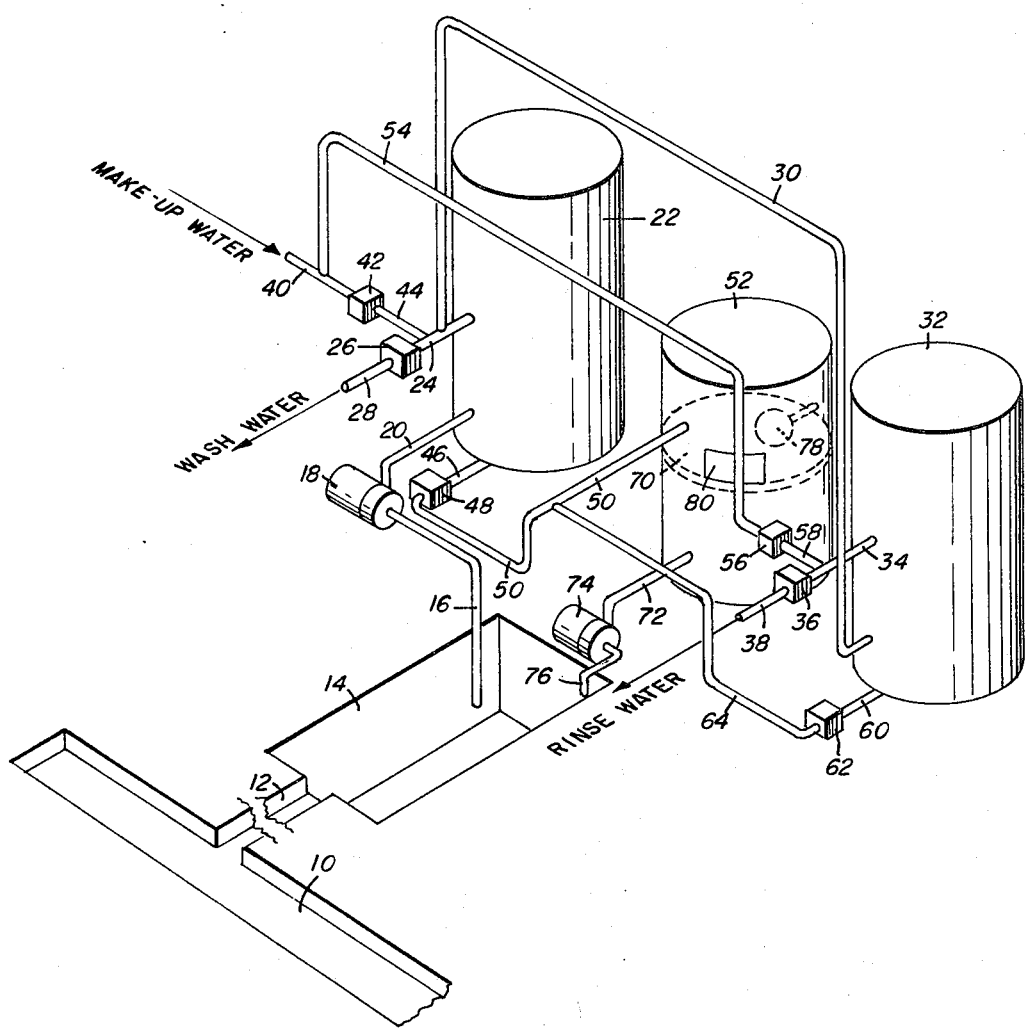
INVENTOR
MARTIN J. BERARDI
BY Bauer and Witherspoon
ATTORNEYS

United States Patent Office 3,384,239
Patented May 21, 1968

3,384,239
PURIFICATION AND RECIRCULATION
OF LIQUID
Martin J. Berardi, 149 NE. 98th St.,
Miami Shores, Fla. 33138
Filed Dec. 7, 1965, Ser. No. 512,054
3 Claims. (Cl. 210—73)

ABSTRACT OF THE DISCLOSURE

This invention is concerned with a filter system for use in conjunction with washing and rinsing apparatus, such as a car wash. The filter system to be described is of the closed recirculating type, and it includes a first filter which removes all the impurities from the wash water except detergent, and a second filter which removes the detergent. The water and detergent from the first filter is re-used as wash water, whereas the water from the second filter is used as rinse water.

This invention relates broadly to the purification and recirculation of liquid which has become loaded with impurities in a given process or operation and more particularly to the purification and recirculation of water used in vehicle car washing systems and other similar systems where water is scarce and discharging of polluted water with detergents is forbidden.

More specifically the purification and recirculation system embodied in this invention is very well adapted for use in the popular automatic or semi-automatic car washes wherein the vehicle is conveyed through a series of washing, rinsing and drying stations. It is necessary that a substantial amount of water be used in such a washing arrangement. This presents at least two major points for consideration, namely, the high cost of water and the method of disposing of the used wash water which contains detergents or the equivalents and a large amount of impurities such as sand, dirt and grease. In most areas there are very strict requirements as to the disposition of detergent containing water. Thus it is apparent that in order to economically operate auto washing apparatus, it is imperative that a wash water purification and recirculation system of the closed type be employed. In some areas ordinances require that such a closed purification and recirculation system be used.

In view of the foregoing it is an object of this invention to provide a purification and recirculation system for removing the impurities from a liquid used in a given process or operation.

It is another object of this invention to provide a closed purification and recirculation system for the washing liquid used in a car wash.

It is yet another object to provide a closed purification and recirculation system for a car wash wherein the detergent laden wash water loaded with foreign matter from the vehicle being washed is filtered to remove most of the foreign matter but not the detergent so that the detergent laden wash water may be returned to the washing station.

It is a still further object to provide a system as above wherein a portion of the cleaned detergent laden wash water is bled off to a detergent removing filter so as to provide a detergent free rinse water.

Another object of this invention is the provision of means for introducing pure water to both filters to backwash said filters and for directing the backwash water loaded with impurities to a settling tank from whence the cleaned backwash water is introduced into the purification and recirculation system.

The above and other objects and advantages will become apparent when taken in conjunction with the following detailed description setting forth one embodiment of this invention and wherein the single figure is a perspective view of the entire purification and recirculation system of this invention as it is embodied in a car wash system.

The purification and recirculation system of this invention as shown in the drawing is embodied in a conventional car wash system wherein the vehicles are conveyed over a prescribed path for washing, rinsing and drying. A longitudinal drain 10 extends under the vehicle for that portion of the path wherein any wash or rinse water may drain therefrom. This drain 10 directs the used wash and rinse liquid to a channel 12 which in turn directs the liquids to a reservoir 14. The size of this reservoir may be varied to a considerable extent depending on the volume of liquids involved in the entire wash system.

The so-called "used" wash and rinse water as it is found in the reservoir 14 is loaded with sand, dirt and other foreign matter which vehicles pick up in their normal travel as well as cleaning components. Actually a portion of the heavier impurities may settle in the reservoir 14, and if they do, it will be necessary to periodically remove such settled material therefrom. The used water is withdrawn from reservoir 14 through conduit 16 by means of pump 18 and delivered through conduit 20 to the bottom of the wash water filter 22. The impurities in the used wash water other than the detergent or other cleaning chemicals are removed from the used wash water by the filter 22 and delivered to the washing apparatus by way of conduit 24, solenoid operated valve 26 and conduit 28.

The filter 22 used to purify the wash water as set forth above is of the type wherein the unclean liquid is received in the tank bottom and delivered centrally to the top of the filter and is then withdrawn somewhere below the midpoint of the tank. The pressure within the wash water filter tank is approximately 60 p.s.i. Such a filter is shown and described, for example, in Brice Patent 2,364,775, or in Hyatt Patent 273,539. The Brice and Hyatt filters use gravel and sand for the filtering medium which are not effective for the removal of detergent in the water.

A conduit 30 is connected to conduit 24 at one end and to the lower end of the rinse water filter 32 at the other. Wash water with the impurities removed but the detergent therein is fed through conduit 30 for removal of the detergent or other cleaning chemicals by means of filter 32. Such a filter is shown and described, for example, in Hoop Patent 2,057,237. The Hoop patent uses a bed of granulated carbon which is effective in removing the detergent from the water. The Hoop filter includes a bed of granulated activated carbon. It is well known that activated carbon is capable of collecting gases, liquids, or dissolved substances on the surface of its pores (McGraw-Hill Encyclopedia of Science and Technology (1960), vol. 1, page 58, column 1). It has been established that activated carbon is effective in removing detergent from water. Here again, the purified rinse water with the detergents removed is withdrawn from the filter by way of conduit 34, solenoid operated valve 36 and conduit 38 leading to the rinsing apparatus.

After a period of operation, filters 22 and 32 will need cleaning and this is accomplished by backwashing each filter with fresh water. The fresh water is fed in through conduit 40, solenoid operated valve 42, conduit 44 and conduit 24 into the filter where it backwashes the filter. The backwash water with the impurities removed from the filter therein is withdrawn from the bottom of the filter by means of conduit 46, through solenoid operated valve 48 into conduit 50 connected to the upper portion of the settling tank 52.

In order to backwash the rinse water filter 32, fresh water is fed through conduit 54, solenoid operated valve 56 and conduit 58 into conduit 34 leading into the filter. The backwash water with the impurities removed from the filter therein is withdrawn from the bottom of the filter through conduit 60, solenoid operated valve 62 and conduit 64 which is connected to conduit 50 leading to the settling tank 52.

The backwash water from both filters is introduced into the settling tank 52 well above a ceramic filter disc 70 fitted in the tank as shown in dotted lines. The ceramic filter acts to remove most of the impurities in the water in the upper part of the settling tank so that the water which is withdrawn from the bottom of the settling tank by means of conduit 72 and pump 74 and then directed through conduit 76 into the reservoir 14 is used as make-up water.

The settling tank 52 is provided with a float 78 which upon rise in the level of backwash water in the tank, actuates a switch starting pump 74 to withdraw water from the tank. This tank is also provided with a suitable manhole 80 to provide access to the tank so that the impurities collected therein may be removed as necessary.

It is believed that the operation and function of this purification and recirculating system is readily apparent from the above description hence only a brief resume of the operation follows. With the system in operative condition, that is with the wash filter 22 and the rinse filter 32 having liquid therein and the pressure in the wash filter at about 60 p.s.i., washing is started by opening solenoid valve 26 so that filtered water with detergent therein may pass from the filter 22, through conduit 24, valve 26 and conduit 28 to the washing apparatus. As soon as the rinse water is needed, valve 36 is opened and rinse water flows from filter 32 through conduit 34, valve 36 and conduit 38 to the rinsing apparatus. As the wash and rinse water comes off the vehicles being washed, it is collected in drain 10 and passed through channel 12 into reservoir 14. The water in the reservoir is loaded with sand, dirt and other impurities. Some of the heavier matter may settle out in the reservoir and require periodic removal. When needed, pump 18 is started so as to withdraw the unclean liquid in the reservoir 14 and by way of conduit 16, pump 18 and conduit 20 introduce it into the bottom of filter 22. The liquid so introduced is filtered and discharged from the filter 22 through conduit 24 with the detergent still therein, through valve 26 and conduit 28 to the washing apparatus.

A portion of the water in conduit 24 is bled off through conduit 30 to furnish the rinse filter with liquid to be filtered. The detergent is filtered out in filter 32 and clean rinse water is drawn off through conduit 34, valve 36 and conduit 38 to the rinsing apparatus. With valves 26 and 36 open and pump 18 operating, the system is in continuous operation.

In order to backwash the filters 22 and 32, valves 26 and 36 are closed while valves 42, 56, 48 and 62 are opened so that fresh water may be introduced into filter 22 by way of conduit 40, valve 42, conduit 44 and conduit 24. The backwash water is withdrawn through conduit 46, valve 48, and conduit 50 which is connected to the upper portion of settling tank 52. Similarly, fresh water proceeds through conduit 54, valve 56 and conduit 58 into filter 32. The backwash water is withdrawn from filter 32 by way of conduit 60, valve 62, conduit 64 and conduit 50, and is introduced into the top portion of the settling tank 52. The dirty backwash water is filtered through a ceramic filter 70 in the settling tank 52 and the filtered water is withdrawn from the bottom of the settling tank by way of conduit 72, pump 74 and delivered to the reservoir 14 by conduit 76. This cleaned backwash water provides the necessary make-up water for the entire system thus providing the ultimate in water economy since the only water actually lost is that carried away by the washed vehicles. Further no detergent or other impurities are at any time outside of the control of the system.

Obviously, the valves and pumps of this system can be tied into an automatic operation with very little difficulty. Yet manual operation is simple and expedient also.

What is claimed as novel is:

1. A closed recirculation and filtering system for use in conjunction with washing and rinsing apparatus wherein wash water having cleaning components therein is fed to the washing apparatus and further wherein rinse water free of cleaning components is fed to the rinsing apparatus, said system comprising reservoir means for storing the wash and rinse water after it has been used, collecting means for returning the used wash and rinse water to the reservoir means, a wash water filter for filtering out foreign matter in the used water and leaving the cleaning components therein, conduit means for delivering the used water in the reservoir means to the wash water filter, discharge conduit means for delivering filtered wash water from the wash water filter to the washing apparatus, a rinse water filter for further filtering the filtered wash water to remove the cleaning components therefrom, conduit means for delivering filtered wash water to the rinse water filter, discharge conduit means for delivering rinse water from the rinse water filter to the rinsing apparatus, separate means for introducing clean make-up water to the wash and rinse water filters to backwash each filter, a settling tank, conduit means for delivering the backwash water from the wash and rinse filters to the settling tank, and means for withdrawing the cleaned backwash water from the settling tank and delivering it to the reservoir means to replenish the water supply therein.

2. The system as set forth in claim 1 and wherein the settling tank is provided with filtering means for removing the foreign matter in the backwash water.

3. A method of recirculating and filtering the water for use in conjunction with washing and rinsing apparatus wherein wash water having a cleaning component therein is fed to the washing apparatus and further wherein rinse water free of the cleaning component is fed to the rinsing apparatus, said method comprising collecting and storing used wash and rinse water in a reservoir after it has been used, withdrawing and feeding the used wash and rinse water to a filter, filtering out the foreign matter from the used water and leaving the detergent therein to produce wash water, feeding a first portion of the wash water with only the detergent therein to the washing apparatus, feeding a second portion of the wash water to a second filter, filtering out the detergent in the wash water to produce clean rinse water, feeding the rinse water to the rinsing apparatus, backwashing both filters with clean make-up water, feeding the backwash water to the reservoir to provide make-up water for the system.

References Cited

UNITED STATES PATENTS

| | | | |
|---|---|---|---|
| 2,729,340 | 1/1956 | Harms | 210—195 |
| 2,828,862 | 4/1958 | Johnson | 210—167 X |
| 2,862,222 | 12/1958 | Cockrell | 210—194 X |
| 2,884,132 | 4/1959 | Kangas | 210—170 X |
| 3,247,104 | 4/1966 | Sako et al. | 210—195 X |

SAMIH N. ZAHARNA, *Primary Examiner.*

REUBEN FRIEDMAN, *Examiner.*

J. ADEE, *Assistant Examiner.*